March 28, 1967  J. C. ST. CLAIR  3,311,919
SYSTEM AND APPARATUS FOR OBTAINING AND CORRELATING
SURFACE DATA MEASUREMENTS
Filed Feb. 11, 1965  4 Sheets-Sheet 1

Jimmy C. St. Clair INVENTOR.

BY

ATTORNEY

March 28, 1967  J. C. ST. CLAIR  3,311,919
SYSTEM AND APPARATUS FOR OBTAINING AND CORRELATING
SURFACE DATA MEASUREMENTS
Filed Feb. 11, 1965  4 Sheets-Sheet 2

Jimmy C. St.Clair INVENTOR.

BY

ATTORNEY

Jimmy C. St. Clair INVENTOR.

BY

ATTORNEY 3,311,919
SYSTEM AND APPARATUS FOR OBTAIN-
ING AND CORRELATING SURFACE
DATA MEASURMENTS
Jimmy C. St. Clair, Huntsville, Ala., assignor to Thiokol
Chemical Corporation, Bristol, Pa., a corporation of
Delaware
Filed Feb. 11, 1965, Ser. No. 431,792
5 Claims. (Cl. 346—33)

This invention relates to improvements in systems and apparatus that are utilized to obtain and correlate surface data measurements and, more particularly, it relates to a system and apparatus that is employed to obtain data relating to the bond integrity of the propellant and liner in a solid propellant rocket motor.

Generally speaking, a solid propellant rocket motor usually consists of a metal or plastic case containing a solid propellant which is separated from the case by a layer of insulating liner that is bonded to the solid propellant and to the case. It is at the bonded interfaces of the case, liner and solid propellant that separations may occur, and such separations are usually referred to as unbonds which indicates the lack of a good bond between the interfaces.

The presence of unbonds in a solid propellant rocket motor creates a serious problem that, if uncorrected, can cause a serious deviation from the designed ballistic performance of a solid propellant rocket motor. An unbond between the case and the liner will result in subjecting the case to high temperature combustion gases and result in the failure thereof due to excessive localized heating of the case. An unbond between the liner and solid propellant will increase the burning surface of the solid propellant which will result in an increase in internal motor pressure. This increase in pressure can exceed the stress limits of the case and result in case rupture or the failure of other components. It is vitally important, therefore, that the detection of unbonds in a solid propellant rocket motor be accomplished for the reliable performance thereof.

It is an object of this invention, therefore, to provide a system and apparatus that will, by the acquiring and correlation of surface data measurements, detect any unbonds that have occurred in the components of a solid propellant rocket motor.

It is also well-known that present types of techniques for determining unbonds, such as tangential radiography, sonics, and ultrasonics, are time-consuming and expensive. The radiographic technique is good for such determinations, but ultrasonics will not establish unbonds between the liner and propellants. The sonic technique is limited to a "silver dollar tap test" wherein audible detection is made by a trained human ear, but none of these techniques uses a recording apparatus, such an included in the system embodying the instant invention. It was desirable, therefore, to perfect a system that was not related in any way to the techniques previously used and without their inherent disadvantages.

Another object of this invention, therefore, was to provide a simple, inexpensive, portable and reliable system that would effectively reduce inspection time and detect and define unbonds in all the interfaces of the component parts of a solid propellant rocket motor.

To condition a solid propellant rocket motor so that the instant invention may be utilized to determine any unbonds therein, it was determined that two methods could be utilized. One called heat-soaking, wherein the solid propellant rocket motor is placed in a conditioning box and the temperature thereof uniformly raised until it can be distinguished from ambient temperature, and the second called transient heating wherein a high intensity heat is focused on a distinct area and such heat is moved across the surface area of the case at a constant heat whereby all the surface area of the case is subjected to the same temperature at a constant and predetermined time delay. After the solid propellant rocket motor has been heated by either of the two methods, the apparatus forming part of the system and which includes thermal sensor or sensing device is utilized to detect any unbonds in the heated solid propellant rocket motor.

To properly accomplish the detection of unbonds and correlate such information for further study and review, it was necessary to provide an apparatus that would control and maintain constant scanning rates by the sensor, rotation of the solid propellant rocket motor, recording of the data dictated by the sensor and a special type of recording stylus that is entirely different from the conventional type of galvonometer pens that are in use at the present time. It was also determined that a recording drum be employed instead of the strip recorder that is presently used, for the drum recorder could in a smaller area plot a better record than would be available on a strip recorder which could be of great length depending on the amount of surface which is presented to the sensor that is used with the instant apparatus.

It is, therefore, another object of the invention to provide a system and apparatus that includes therein a rotary drum recorder and a rotary intensity controlled trace shading stylus that will transmit to the drum recorder the information that is acquired by the sensor of the apparatus.

It was determined that, when a solid propellant rocket motor was conditioned under one of the two methods previously referred to, the temperature over an unbonded area would rise more than the temperature over a bonded area and subsequently cool faster. Thus, the sensor of the apparatus would be able to detect the unbonds either by a sudden rise in temperature or a sudden drop in temperature; and such information would be transmitted to the stylus for the recording thereof on the drum recorder. While the sensor would not actually contact the case, the close proximity of the sensor to the case would affect the temperature of the sensor; thus any slight variations in the temperature of the case is easily detected by the sensor.

The system and apparatus has also been used with laminates other than solid propellant rocket motors, and it has been definitely determined that, regardless of the material which is subjected to the detection of the apparatus, unbonds of any nature that is inherent to the laminates could be successfully detected.

It has also been established that area size will not drastically affect the apparatus if the conditioning methods previously referred to are carried out properly.

Therefore, with the above and other objects and advantages in view, the invention consists of the details of construction and arrangement of parts more thoroughly hereinafter described, claimed and illustrated in the accompanying drawings in which:

Figure 1:
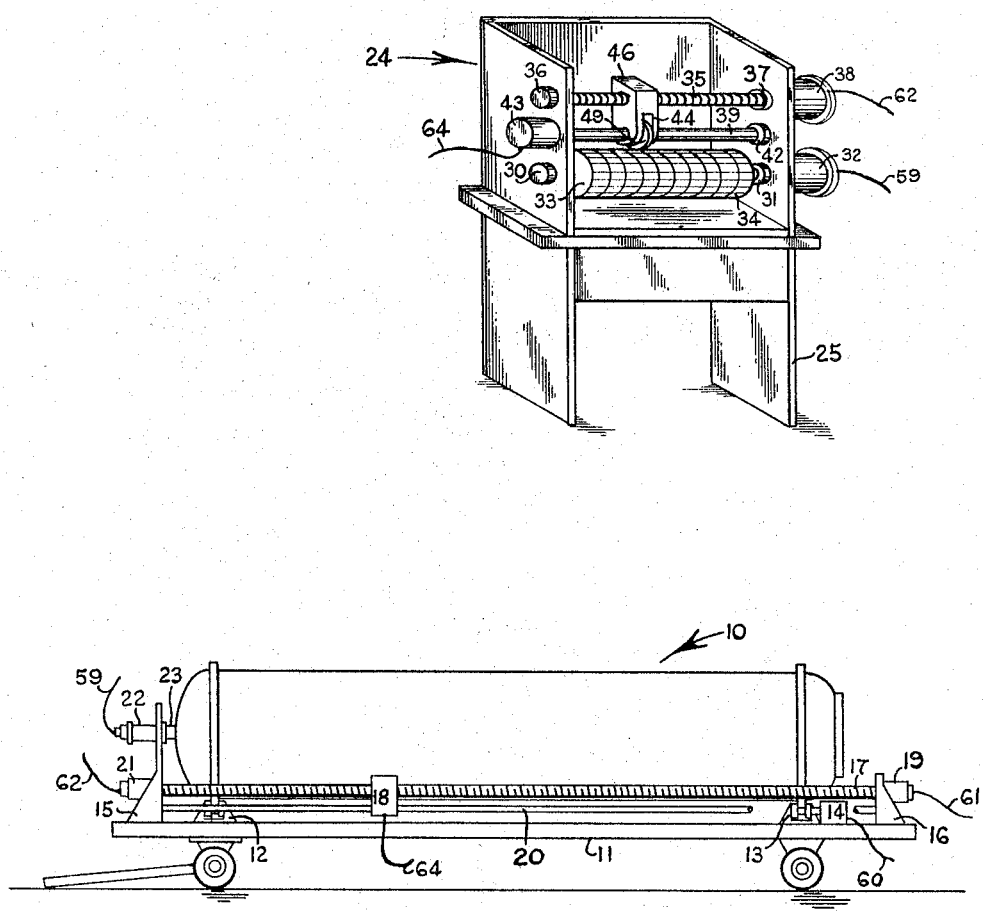
FIGURE 1 is a schematic view showing how unbonds in a solid propellant rocket motor are detected and recorded by the system and apparatus embodying the present invention, it being noted that, for purposes of clarity, the cables connecting the various components of the invention have been omitted.
Figure 2:
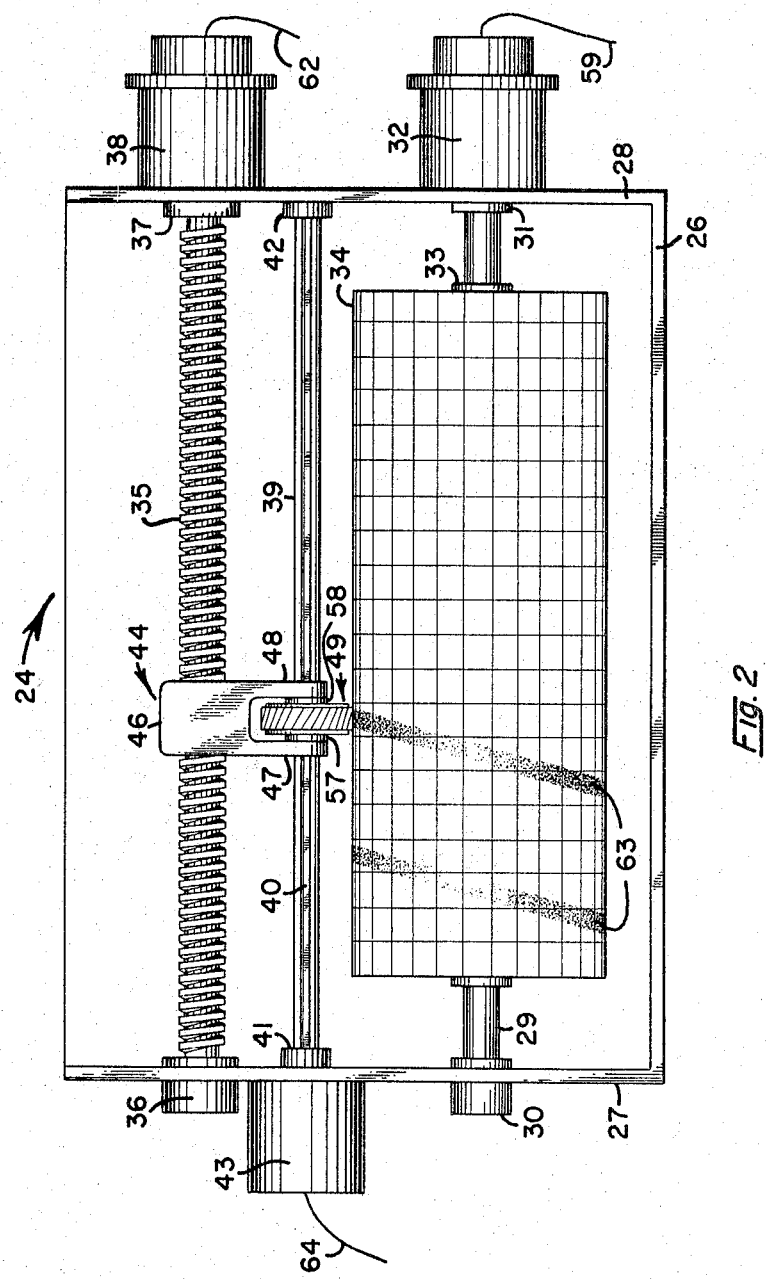
FIGURE 2 is an elevational view of the drum recorder of the apparatus as shown in FIGURE 1.
Figure 3:
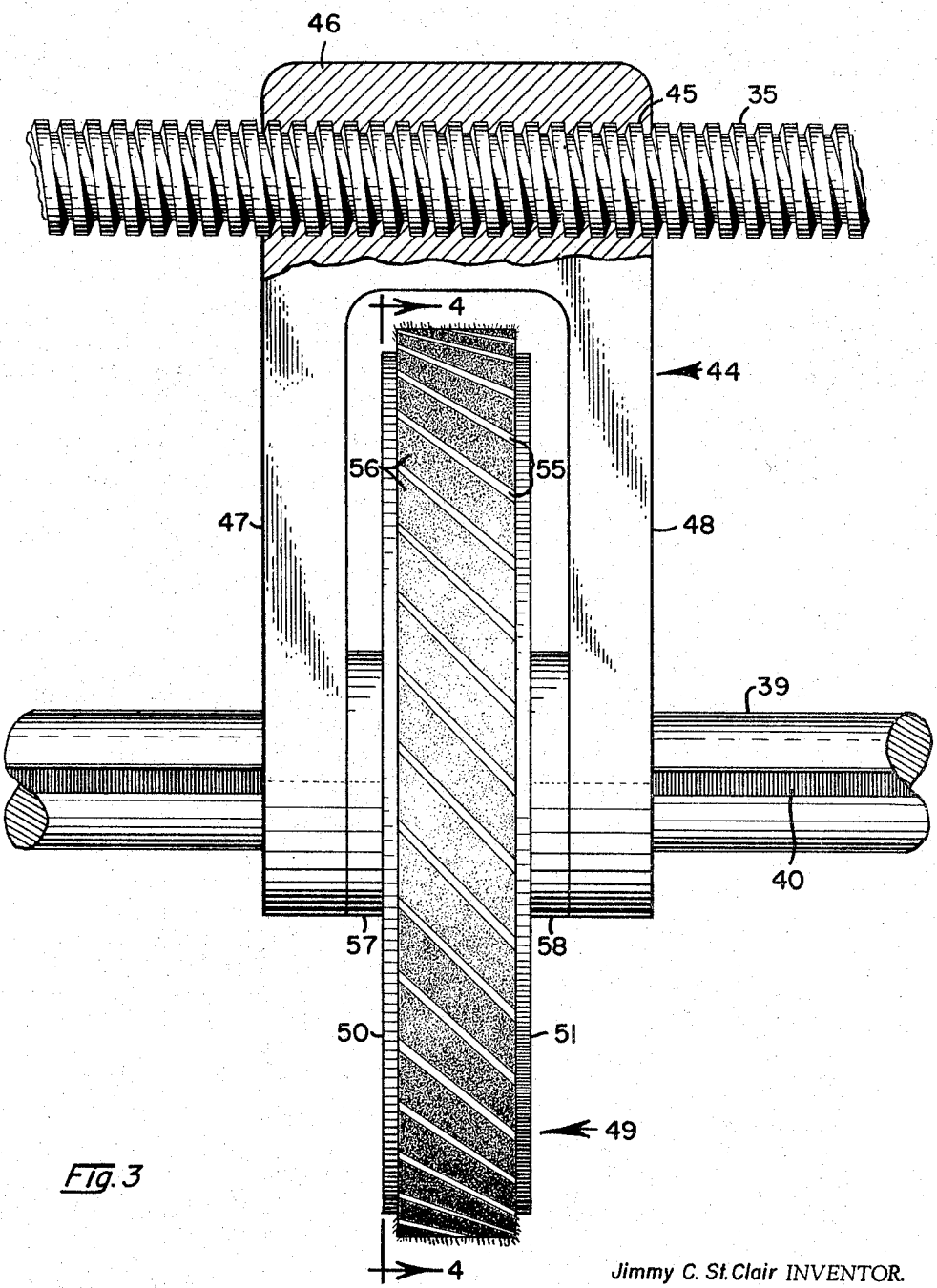
FIGURE 3 is an enlarged view, partly in section and partly broken away, of the stylus assembly forming a part of the recorder of FIGURE 2.
Figure 4:
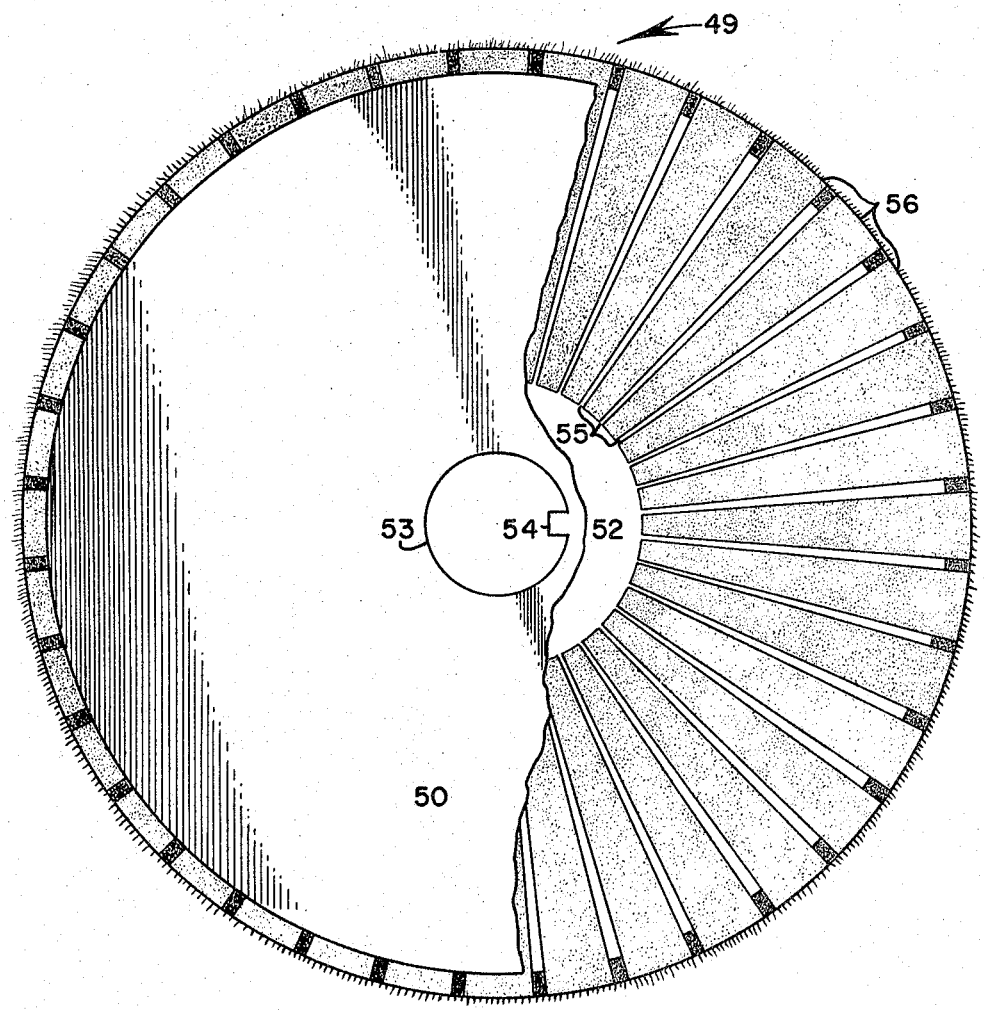
FIGURE 4 is a side elevational view, partly in section, of the stylus, per se, as seen on the line 4—4 of FIGURE 3.

Referring more in detail to the drawings wherein like parts are designated by like reference numerals, the reference numeral 10 is used to generally designate a solid propellant rocket motor which is being subjected to the system and apparatus embodying the subject invention for the purpose of determining any unbonds that have occurred in the interfaces of the components of the solid propellant rocket motor 10.

In order to properly position the rocket motor 10 in a horizontal position, there is provided a dolly 11 on which are mounted adjacent one end thereof idler rollers 12 which support, for the rotation thereof, the head end of the rocket motor 10. To support the aft end of the rocket motor 10, there are mounted on the dolly 11 adjacent the opposite end thereof, power driven rollers 13; and such power is achieved by the means of one or more electric motors 14 which are operationally connected to the rollers 13. The number of electric motors 14 that are to be utilized for driving the rollers 13 depend upon the size and weight of the rocket motor 10 and the speed of rotation thereof that is required to properly measure the rocket motor 10. There is no direct drive between the rocket motor 10 and the rollers 13 but the rotation of the rocket motor 10 is obtained by the functional engagement of the rocket motor 10 with the rollers 13.

A supporting bracket 15 is mounted on the dolly 11 at one end thereof adjacent to but in spaced relation with regard to the rollers 12 and a bracket 16 is mounted on the dolly 11 at the opposite end thereof adjacent to but in spaced relation with regard to one of the electric motors 14. The brackets 15 and 16 are aligned with each other along a plane parallel to the longitudinal axis of the dolly 11 so that a screw shaft 17 journalled at its opposite ends in the brackets 15 and 16 will line in a plane that is in parallel spaced relation to the rocket motor 10 and is in parallel relation to the longitudinal axis thereof.

A sensing element 18 commonly known as a 41A401C thermistor, that is manufactured by Victory Engineering Corporation, is mounted on the screw shaft 17 so that, as the screw shaft 17 is rotated by means of an electric motor 19 that is connected thereto and mounted on the bracket 16, worm threads in the sensing element 18 will cooperate with the screw shaft 17 to cause the sensing element 18 to travel along the longitudinal length of the screw shaft 17.

A stabilizing rod 20 is mounted at its opposite ends in the brackets 15 and 16 so that it will be positioned in a plane that is in spaced parallel relation with the screw shaft 17 and extending through the sensing element 18 stabilizes the sensing element 18 to prevent it from rotating on the screw shaft 17 and to properly present the sensing element 18 to the outer surface of the rocket motor 10.

A small two-pole alternator or selsyn 21 is mounted on the bracket 15 and is secured to the opposite end of the screw shaft 17 to which the electric motor 19 is secured. A second selsyn 22 is mounted on the bracket 15 above the selsyn 21 and is connected to the head end of the rocket motor 10 at 23.

In order that the information secured by the sensing device 18 be recorded, the system embodying the instant invention also includes a rotary drum recording mechanism 24. A suitable table or support 25 is provided so that the recording mechanism 24 may be positioned thereon in elevated relation to the ground or floor level on which the dolly 11 will rest.

The recording mechanism 24 comprises an open face and open top box-like frame 26 which includes end walls 27 and 28 respectively. A shaft 29 is journalled at its opposite ends as at 30 and 31 in the end walls 27 and 28 of the frame 26; and a selsyn 32 is mounted on the end wall 28 of the frame 26 and is secured to the end of the shaft 29 that is journalled at 31 in the end wall 28.

A drum 33 is mounted on and secured to the shaft 29, and a graph chart 34 is mounted on the drum 33.

A screw shaft 35 is journalled at its opposite ends as at 36 and 37 in the end walls 27 and 28 of the frame 26, and the screw shaft 35 is in elevated spaced parallel relation to the shaft 29. A selsyn 38 is mounted on the end wall 28 of the frame 26 and is secured to the end of the shaft 35 that is journalled at 37 in the end wall 28.

The selsyns 21, 22, 32 and 38 are transmitters and receivers for electrical transmission and are small two-pole alternators including a stator and a rotor assembly. The selsyn is a conventional piece of equipment and is clearly described in Navy publication "Radar System Fundamentals," To. 16–1–145, Navships 900.017, pages 314 to 318.

There is a third shaft 39 that is provided with a longitudinal slot 40 which is journalled at its opposite ends as at 41 and 42 in the end walls 27 and 28 of the frame 26 and is positioned intermediately of the shafts 29 and 35 in spaced parallel relation thereto. Mounted on the end wall 27 of the frame 26 is a conventional Bristol, Leeds and Northrup D.C. Potentiometer recording mechanism 43, and the shaft of the potentiometer is coupled at the end thereof to the end of the shaft 39 that is journalled at 41 in the end wall 27 of the frame 26.

A substantially U-shaped housing 44 is mounted on and has operational relation with the screw shaft 35 by reason of the worm threads 45 that are provided in the bight portion 46 of the housing 44, and the legs 47 and 48 of the housing 44 are provided with aligned openings therein to receive the shaft 39.

Mounted on the shaft 39 within the housing 44 and intermediate of the legs 47 and 48 is a rotary intensity controlled, trace shading, disc stylus 49. The stylus 49 generally assumes the form of a reel having circular side panels 50 and 51 respectively that are rigidly joined in spaced relation to each other by a hub 52. Each of the side panels 50 and 51 are provided with a central opening 53 that corresponds to and is aligned with the central bore of the hub 52 and each of the side panels 50 and 51 are provided with a key or projection 54 that extends into each of the openings 53 in the side panels 50 and 51 and entering the slot 40 in the shaft couples the stylus 49 to the shaft 39 so that, as the shaft 39 rotates, the stylus 49 will rotate simultaneously therewith. Extending between the side panels 50 and 51 and integral at their inner ends with the hub 52 are a plurality of dividers or separators 55, and these dividers or separators 55 extend at a 45° angle to each other and to the transverse axis of the reel forming the stylus 49, and the longitudinal axis of the hub 52. These components of the stylus 49 may be formed from a suitable light metal or of a plastic material, whichever is the least expensive, since the stylus 49 can be expendable if desired. Positioned in each of the pockets intermediate of and formed by the dividers or separators 55, there is a felt pad 56; and the pads 56 assume the same angles as do the dividers or separators 55. The pads 56 are thoroughly saturated each with a different color of ink so that such colors will form a spectrum of colors from red to violet, the density and variations of the colors to be determined by the number of felt pads 56 that are incorporated into the stylus 49.

Positioned on the shaft 39 intermediate of the legs 47 and 48 and the side panels 50 and 51 with one on each side of the stylus 49 are a pair of spacing washers 57 and 58 respectively. The tolerances between the stylus 49, the spacing washers 57 and 58 and the legs 47 and 48 of the housing 44 are such that the stylus 49 will rotate easily but any lateral play of the stylus 49 will be prevented or minimized as to the existing tolerances between the component parts of the housing 44 and stylus 49, as previously described.

In the operation of the system and apparatus embodying the invention, the rocket motor 10 is placed on the rollers 12 and 13, and the rollers 13 are driven by the electric motors 14 to rotate the rocket motor 10 as required.

The selsyn 22 has the rotor thereof connected at 23 to the head end of the rocket motor 10, and the stator thereof is connected by suitable cables 59 to the stator of the selsyn 32 that is mounted on the end wall 28 of the frame 26 and with the rotor thereof secured to one end of the shaft 29. As the rocket motor 10 rotates, the rotor of the selsyn 22 rotates cutting flux lines esablished by the stator thereof. This action creates a synchronous current which is fed to the stator of the selsyn 32. Thus, rotational synchronization of the rocket motor 10 and the drum 33 is obtained.

The electric drive motors 14 for the rollers 13 and the electric motor 19 connected to one end of the screw shaft 17 are connected by suitable cables 60 and 61 to a conventional electrical synchronizing device, not shown, which, in turn, is connected to a source of electrical current. Thus, the speed of rotation of the rocket motor 10 and the speed of rotation of the screw shaft 17 will be rotationally synchronized.

As the screw shaft 17 is rotated by the electric motor 19, the sensing element 18 traverses the longitudinal axis of the rocket motor 10 in a similar manner as does a tool holder in a lathe. Rotation of the screw shaft 17 causes rotation of the rotor of the selsyn 21 that is secured thereto resulting in the rotor of the selsyn 21 rotating and cutting flux lines established by the stator thereof. With the stator of the selsyn 21 connected by suitable cables 62 to the stator of the selsyn 38, the rotation of the rotor of the selsyn 38 and the screw shaft 35 conneced thereto at one end thereof is rotationally synchronized with the speed of rotation of the screw shaft 17. The rotation of the screw shaft 35 will cause the housing 44 to traverse the longitudinal axis of the drum 33, and the movement of the housing 44 along the screw shaft 35 will be synchronized with the movement of the sensing element 18 along the screw shaft 17. To accomplish this, the number of screw threads on the screw shaft 17 should have for its entire length the same number of screw threads that are on the screw shaft 35 for its entire length. Thus, a full scale travel of the housing 44 on the screw shaft 35 will be accomplished that is equal to the full length travel of the sensing element 18 on the screw shaft 17.

As previously described, an intensity-controlled, trace shading disc stylus 49 is mounted for rotation within the housing 44. The pads 56 of the stylus 49 will record a color trace 63 on the chart 34 that is positioned on the drum 33. The stylus 49 will thus record the signal amplitudes that are picked up by the sensing element 18 as it traverses the length of the rocket motor 10.

This is accomplished by connecting the sensing element 18 with suitable cables 64 to potentiometer recording mechanism 43 and by connecting the shaft of the potentiometer of the mechanism 43 to the shaft 39, as previously described.

The angularity of the pads 56 with regard to the transverse axis of the stylus 49 will cause the leading angular edge of a pad 56 to begin its color trace as the trailing edge of the next preceding pad 56 ends its color trace. Thus, there is very little overrun of the colors in the color trace 63 on the chart 34.

The operation of the system and apparatus have been clearly set forth; and to permit the sensing device 18 to detect unbonds in the rocket motor 10, such motor may be conditioned by one of the two methods previously described.

If the heat soaking method is utilized, no further equipment is required to be used with the apparatus for the sensing element 18 will quickly detect the unbonds by the variance in temperatures in the rocket motor 10, as previously described.

If transient heating is utilized to condition the rocket motor, some heating device must be positioned adjacent to the sensing element 18 by any suitable support to heat a certain designated area on the rocket motor 10 and the support is such that the heating device may be moved along the longitudinal axis of the rocket motor 10 as required.

The rotation of the rocket motor 10 by the rollers 13 can be regulated to provide various rates of scanning speed for the sensing element 18; but it has been found that the slower the scanning speed of the sensing element 18 the better the results will be that will be recorded on the chart 34.

The heat soaking method is used for a period that will insure sufficient heat within the rocket motor 10 for the sensing element 18 to inspect the entire length of the rocket motor 10. The transient heating method, however, as utilized will heat continuously the designated areas to be inspected and such heat will be continued until the sensing element 18 has inspected the entire length of the rocket motor 10.

The correlation of the data obtained by the sensing element 18 with the data subsequently recorded on the chart 34 by the stylus 49 is a primary result that is obtained by the use of the system and apparatus embodying the invention. Such correlation establishes in orderly relation that each point that is recorded on the chart 34 will correspond directly with a particular point on the rocket motor 10 as it is scanned by the sensing element 18. Thus, as each point on the rocket motor 10 is scanned by the sensing element 18, the exact condition of the area of the rocket motor 10 adjacent to that point will be transmitted to and recorded on the chart 34 by the stylus 49. The color trace 63 that is produced on the chart 34 by the stylus 49 will in effect be a true graphic representation of the condition of the rocket motor 10 depicting by the different variations in the color trace 63 the exact location of any unbonds that may exist in the rocket motor 10.

It is believed that the foregoing description, when taken in conjunction with the accompanying drawings, will permit one skilled in the art to clearly understand the invention; and it is to be understood that variations therein may be adhered to provided such variations fall within the spirit of the invention and the scope of the appended claims.

Having thus described the invention, what is claimed as new and desired to be secured by Letters Patent is:

1. A system and apparatus for obtaining surface data measurements comprising means for rotating an object to be measured, means for obtaining such measurements, means for moving said last said means along the longitudinal axis of said object, a rotary drum, a trace shading disc shaped stylus for implementing a color trace on a graph chart positioned on said rotary drum for recording the measurements obtained by the means for measuring said object, said stylus comprising a reel having a pair of circular side panels, a plurality of dividers extending between said side panels in spaced relation thereto and a plurality of ink pads positioned between said dividers and having contact with said chart.

2. A system and apparatus, as in claim 1, wherein said dividers are positioned between said side panels as a 45° relation to the transverse axis of said reel.

3. A system and apparatus, as in claim 1, wherein a screw shaft is provided for mounting the means for measuring said object and a shaft is provided for rotating said rotary drum and means connected to the object to be measured and means on the end of the shaft for mounting said rotary drum for rotationally synchronizing the speeds of rotation thereof.

4. A system and apparatus, as in claim 1, wherein a shaft is provided for rotating said stylus and means is provided for rotating said shaft and said last said means has operational connections with the means for obtaining the measurements of said object whereby the speed of rotation of said shaft is synchronized with the movements of said last said means along the longitudinal axis of said object.

5. An apparatus for determining unbonds in a preconditioned rocket motor comprising means for rotating said rocket motor, a screw shaft mounted in parallel relation to the longitudinal axis of said rocket motor, a sensing device mounted on said screw shaft for scanning said rocket motor, a recording mechanism including a rotary drum having a graph chart thereon, a disc-shaped stylus for providing a color trace on said chart, means for moving said stylus along the longitudinal axis of said rotary drum, means connected to said rocket motor and to said recording mechanism to rotationally synchronize the speed of rotation of said rocket motor and said rotary drum, means connected to the screw shaft for mounting said sensing device and said recording mechanism for rotationally synchronizing the speed of rotation of said last said screw shaft and the movement of said stylus, and means connected to said sensing device and to said recording device for transferring the measurements obtained by said sensing device to said stylus.

References Cited by the Examiner

UNITED STATES PATENTS

| | | | |
|---|---|---|---|
| 2,676,867 | 4/1954 | Kareby | 346—125 X |
| 2,843,670 | 7/1958 | Hell et al. | 346—140 X |
| 3,169,393 | 2/1965 | Stebbins | 73—67.9 |

RICHARD B. WILKINSON, *Primary Examiner.*

J. W. HARTARY, *Assistant Examiner.*